1-(ALKOXYPHENYLALKYL)-2-IMIDAZOLINONES, -2-IMIDAZOLIDINONES AND -2-PYRIMIDINONES

Antony M. Akkerman and Josephus F. Michels, Amsterdam, Netherlands, assignors to N.V. Nederlandsche Combinatie voor Chemische Industrie, Amsterdam, North Holland, Netherlands, a limited-liability company of the Netherlands
No Drawing. Filed Nov. 16, 1962, Ser. No. 238,276
Claims priority, application Great Britain, Nov. 17, 1961, 41,216/61
7 Claims. (Cl. 260—251)

This invention relates to new 1-(alkoxyphenylalkyl)-2-imidazolinones, -2-imidazolidinones and -2-pyrimidinones, and their manufacture.

The compounds according to the invention are represented by the following general formula:

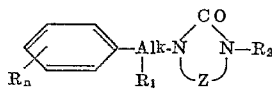

Formula I in which:

$R_n$ represents one to three methoxy or ethoxy radicals or a methylenedioxy group, Alk is a straight chain alkylene radical containing from 1–3 carbon atoms, $R_1$ is a hydrogen atom or an alkyl or alkoxy group containing one or two carbon atoms, $R_2$ is a hydrogen atom, a lower alkyl group or a bond attached to Z, and Z represents one of the radicals

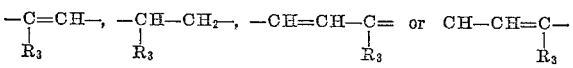

in which $R_3$ is a hydrogen atom or a lower alkyl group.

The new compounds are useful therapeutic agents which act on the central nervous system.

More specifically, the novel compounds are valuable tranquilizers. They are especially useful because of their low toxicity, while serious side-effects have not been noted.

Preferred compounds embodying the invention are represented by the above Formula I wherein $R_n$ stands for two methoxy groups in positions 3 and 4, Alk is an ethylene radical, and $R_1$ is either hydrogen or methyl.

The compounds of the invention may be prepared by various methods that have been previously employed for the production of similar compounds.

Essentially, these methods consist of cyclisizing a suitable urea derivative or the reaction product of the latter with a proper three-carbon-atom fragment.

Thus, compounds containing the five-membered heterocyclic ring are prepared most conveniently by treating ureidoacetals of the formula

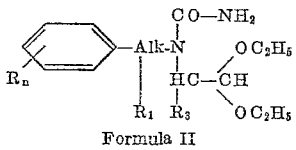

Formula II in which $R_n$, $R_1$, $R_3$ and Alk have the above defined meanings, with an acid, which causes liberation of the aldehydes and eventually their cyclisation to the imidazolinone derivatives.

The starting compounds according to Formula II, may be prepared by reacting a salt of an aminoacetal of the formula

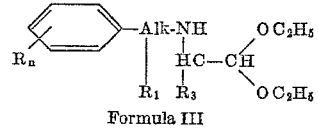

Formula III in which $R_n$, $R_1$, $R_3$ and Alk have the above-defined meanings with a solution of potassium cyanate.

The imidazolidinones may be prepared from the imidazolinones by reduction, for example, catalytic hydrogenation.

Another method for the preparation of the imidazolidinone derivatives, consists in heating an ethylene diamine, which may or may not be C-substituted, of the formula

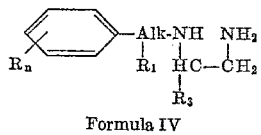

Formula IV in which $R_n$, $R_1$, $R_3$ and Alk have the above defined meanings, with urea or another suitable carbonic acid derivative.

Compounds containing the six membered heterocyclic ring—that is, the 2-pyrimidinones—may be prepared by reacting, under acidic conditions, an urea of the formula

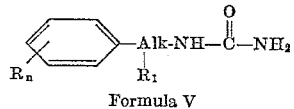

Formula V in which $R_n$ and $R_1$ have the above defined meaning, with a 1,3-dicarbonyl compound of the formula

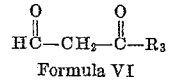

Formula VI in which $R_3$ represents a radical as defined above.

Instead of the dicarbonyl compound itself, suitable functional derivatives thereof may also be used, for example, the mono- or di-acetals which, in particular, are very useful.

Finally, those compounds having an unsubstituted nitrogen in the heterocyclic ring, that is, when $R_2$ is H in Formula I, may be alkylated by means of a suitable alkylating agent, for instance an alkyl sulphate in an alkaline medium, giving substances according to Formula I in which $R_2$ is a lower alkyl.

The following examples are not intended to restrict the invention, but only serve to illustrate methods of preparing the compounds. Variations will be apparent to those skilled in the art.

*Example 1*

A solution of 64 grams of potassium cyanate in 400 ccs. of water is added with stirring to a solution of 150 grams of 2-(3,4-dimethoxyphenyl)ethylaminoacetaldehyde diethylacetal in 500 ccs. of ethanol. The mixture is cooled to a temperature of —15° C. and 300 ccs. of 2 N hydrochloric acid are added dropwise with continuous stirring. Hereupon the temperature is raised to —5° C. and after one hour lowered to —15° C. again. Now 75 ccs. of 2 N hydrochloric acid are added, the mixture is stirred for two hours at —5° C. and then for one hour at room temperature. The ethanol is evaporated in vacuo and the remaining mixture is extracted with chloroform. The extract is dried over magnesium sulphate and the solvent evaporated in vacuo.

The residue, consisting of ureidoacetal, is dissolved in 1200 ccs. of ethanol. The solution is cooled to 0° C. and 300 ccs. of 0.4 N sulphuric acid are added.

After being kept at room temperature for three days, the solution is neutralized with potassium hydrogen carbonate and the ethanol evaporated in vacuo. The residue is extracted repeatedly with chloroform, the combined extracts are dried over magnesium sulphate and the solvent is removed by distillation. The residue is dissolved in an equal volume of hot ethyl acetate. On cooling and standing overnight, the solution deposits a crystalline solid, which is filtered and washed with cold ethyl acetate. The 1-[2-(3,4-dimethoxyphenyl)ethyl]-2-imidazolinone obtained, melts at 125–126° C. Yield 81 grams (65%).

*Example 2*

In the same way as described in Example 1, however, using 2-(3,4-diethoxyphenyl)ethylaminoacetaldehyde diethylacetal instead of the 3,4-dimethoxy derivative, the 1-[2-(3,4-diethoxyphenyl)ethyl]-2-imidazolinone is prepared. After recrystallization from ethyl acetate, the compound melts at 135–137° C. Yield 62%.

*Example 3*

In the same way as described in the foregoing examples, however, starting from 2-(3,4-dimethoxyphenyl)propylaminoacetaldehyde diethylacetal, the 1-[2-(3,4-dimethoxyphenyl)propyl]-2-imidazolinone is prepared. Melting point 128–129° C., yield 70%.

*Example 4*

To a solution of 10 grams of 1-[2-(3,4-dimethoxyphenyl)ethyl]-2-imidazolinone in 100 ccs. of methanol, 100 milligrams of platinum dioxide are added. The mixture is shaken in an atmosphere of hydrogen at room temperature. After the calculated amount of hydrogen has been taken up, the catalyst is filtered off and the solvent evaporated in vacuo. The product obtained can be recrystallized from ethyl acetate, yielding pure 1-(3,4-dimethoxyphenylethyl)-2-imidazolidinone, melting at 123° C.

*Example 5*

In the same way as described in Example 4, however, starting from 1-[2-(3,4-dimethoxyphenyl)propyl]-2-imidazolinone, the 1-[2-(3,4-dimethoxyphenyl)propyl]-2-imidazolidinone, melting at 113–115° C., is obtained.

*Example 6*

A mixture of 9.3 grams of N-[2-(3,4-dimethoxyphenyl)ethyl]-ethylenediamine and 2.9 grams of urea is heated at 160–190° C. for one and a half hours. A vivid evolution of ammonia occurs. The reaction mixture is dissolved in 20 ccs. of boiling water. After cooling, the precipitated crystals are filtered off and recrystallized from ethyl actate. The 1-[2-(3,4-dimethoxyphenyl)ethyl]-2-imidazolidinone obtained, melts at 123–125° C. Yield 7.5 grams.

*Example 7*

In the same way as described in Example 6, however, starting from N-[2-(3,4-dimethoxyphenyl)propyl]-ethylenediamine, the 1-[2-(3,4-dimethoxyphenyl)propyl]-2-imidazolidinone, melting at 113–115° C., is obtained.

*Example 8*

A mixture of 7.7 grams of 2-[2-(3,4-dimethoxyphenyl)-ethylamino]-propionaldehyde diethylactal in 30 ccs. of ethanol and 3.2 grams of potassium cyanate in 20 ccs. of water is stirred and cooled to −15° C., when 15 ccs. of 2 N hydrochloric acid are added dropwise. After one hour, 4 ccs. of 2 N hydrochloric acid are added with continuous stirring. Altogether, the reaction mixture must be kept below 0° C. for four hours, whereupon it is allowed to attain room temperature and worked up as described in Example 1. The ureidoacetal obtained is heated on the steam-bath with 2 N acetic acid for two hours. On cooling the solution, a precipitate separates, which is filtered off and recrystallized from ethyl acetate. The 1-[2-(3,4-dimethoxyphenyl)ethyl]-5-methyl-2-imidazolinone obtained, melts at 168–170° C. Yield 55%.

*Example 9*

A mixture of 1 mole of 2-(3,4-diethoxyphenyl)ethylamine, 1 mole of chloroacetaldehyde diethylacetal and 2.5 moles of potassium carbonate is heated at 130° C. for 18 hours with stirring. Hereupon, the reaction mixture is extracted with benzene, the extract is filtered and the solvent removed by distillation. The crude 2-(3,4-diethoxyphenyl)ethylaminoacetaldehyde diethylacetal is distilled under a pressure of 0.3 mm. mercury, B.P. 160–169° C. Yield 65%.

In the same way are prepared:

2-(3,4-dimethoxyphenyl)ethylaminoacetaldehyde diethylacetal, B.P. 148–149° C./0.4 mm., 2-(3,4-dimethoxyphenyl)propylaminoacetaldehyde diethylacetal, B.P. 155–160° C./1 mm., and 2 - [2-(3,4-dimethoxyphenyl)ethylamino]propionaldehyde diethylacetal, B.P. 143–145° C./0.2 mm.

*Example 10*

To a boiling solution of 9.0 grams of N-[2-(3,4-dimethoxyphenyl)ethyl]-urea and 7.2 grams of 1-ethoxy-1,3,3-trimethoxy propane in 100 ml. of ethanol, there were added 8 ml. of concentrated hydrochloric acid. After boiling had been continued for two hours, the mixture was cooled and the yellow crystalline solid filtered and washed with ethanol. Yield 9.7 grams of 1-[2-(3,4-dimethoxyphenyl)ethyl]-2-(1H)-pyrimidinone hydrochloride. Melting point 208–210° C.

*Example 11*

N-[2-(3,4-dimethoxyphenyl)ethyl]-urea (13.5 grams) and 4,4-dimethoxy-2-butanone (8.0 grams) were dissolved in 120 ml. of boiling ethanol. Concentrated hydrochloric acid (12 ml.) was added and boiling continued for three hours. The residue, obtained by evaporation of the ethanol, was treated with 100 ml. of acetone when 9.2 grams of a yellow crystalline solid separated. This crude product was purified by converting it into the free base which was readily soluble in chloroform. The solution was treated with decoloring carbon and evaporated. The residue was dissolved in 50 ml. of acetone and an equivalent of ethanolic hydrogen chloride was added. The yellow crystalline precipitate consisted of 8.1 grams of 1-[2-(3,4-dimethoxyphenyl)ethyl]-4-methyl-2(1H)-pyrimidinone hydrochloride. Melting point 206–208° C.

*Example 12*

In a similar manner as described in Examples 10 and 11, 5.5 grams of 1-[2-(3,4-dimethoxyphenyl)propyl]-2(1H)-pyrimidinone (recrystallized from water, M.P. 129°–130° C.) were obtained by reaction of 9.5 grams of N-[2-(3,4-dimethoxyphenyl)propyl]-urea with 7.2 grams of 1-ethoxy-1,3,3-trimethoxypropane in 100 ml. of ethanol and 8 ml. of concentrated hydrochloric acid.

*Example 13*

To a stirred solution of 7.3 grams of 1-[2-(3,4-dimethoxyphenyl)ethyl]-2-imidazolinone in 75 ml. of a ten percent aqueous solution of sodium hydroxide, dimethyl sulphate (8.4 ml.) was added dropwise at room temperature. Stirring was continued at 30° for one hour. Unreacted dimethyl sulphate was decomposed by addition of a twenty percent aqueous solution of sodium hydroxide and heating the mixture for one hour on the steam-bath. The product could be extracted from the mixture with chloroform. Colored impurities were removed by running the solution through a column of aluminum oxide. The crude product was recrystallized from a mixture of benzene and light petrol. Yield 5 grams 1 - [2-(3,4 - dimethoxyphenyl)ethyl] - 3-methyl-2-imidazolinone, melting point 83–84° C.

We claim:
1. A compound of the forumla:

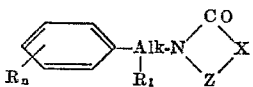

in which

Alk is ethylene, $R_n$ is selected from the class consisting of methoxy at each of the 3 and 4 positions and methylenedioxy at the 3 and 4 positions, $R_1$ is selected from the class consisting of a hydrogen atom and methyl, X is selected from the class consisting of N=, when the ring is pyrimidinone, and N—$R_2$, in which $R_2$ is selected from the class consisting of a hydrogen atom and lower alkyl, and Z represents a radical selected from the class consisting of

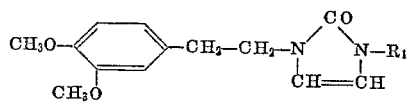 and —C=CH—CH= in which $R_3$ is selected from the class consisting of a hydrogen atom and lower alkyl.

2. A compound of the formula

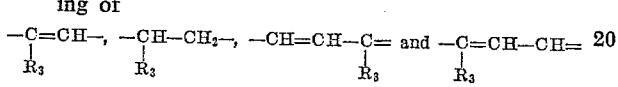

in which $R_1$ is lower alkyl.

3. 1-[2-(3,4 - dimethoxyphenyl)ethyl] - 3-methyl-4-imidazolin-2-one.

4. 1-[2-(3,4 - dimethoxyphenyl)ethyl] - 4-imidazolin-2-one.

5. 1-[2-(3,4 - dimethoxyphenyl)propyl]-4-imidazolin-2-one.

6. The hydrochloride of a compound of the formula:

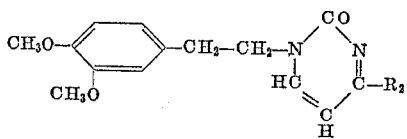

in which $R_2$ is lower alkyl.

7. 1-[2-(3,4 - dimethoxyphenyl)ethyl] - 2 - (1H)-pyrimidinone hydrochloride.

References Cited by the Examiner
UNITED STATES PATENTS

| | | | |
|---|---|---|---|
| 2,397,250 | 3/46 | Duschinsky | 260—309.7 |
| 2,404,300 | 7/46 | Kyrides et al. | 260—309 |
| 2,517,750 | 8/50 | Wilson | 260—309.7 |
| 2,707,186 | 4/55 | Duschinsky | 260—309.6 |
| 2,969,372 | 1/61 | Braun et al. | 260—310 |

OTHER REFERENCES

Albert et al.: Jour. Chem. Soc. (London), 1956, pp. 1294–1304.

Marshall et al.: Jour. Chem. Soc. (London), 1951, pp. 1004–17.

Najer et al.: Bul. Soc. Chim, France, vol. 24, pp. 1069–72 (1957).

Weygand: Organic Preparations, pp. 10–15, N.Y., Interscience, 1945.

WALTER A. MODANCE, *Primary Examiner.*

NICHOLAS S. RIZZO, *Examiner.*